April 12, 1960   R. KINNICUTT, JR., ET AL   2,932,381
TORQUE EQUALIZER
Filed April 23, 1958   3 Sheets-Sheet 1

INVENTORS
Roger Kinnicutt Jr.
BY William J. Hill
Norman J. Blodgett
Attorney

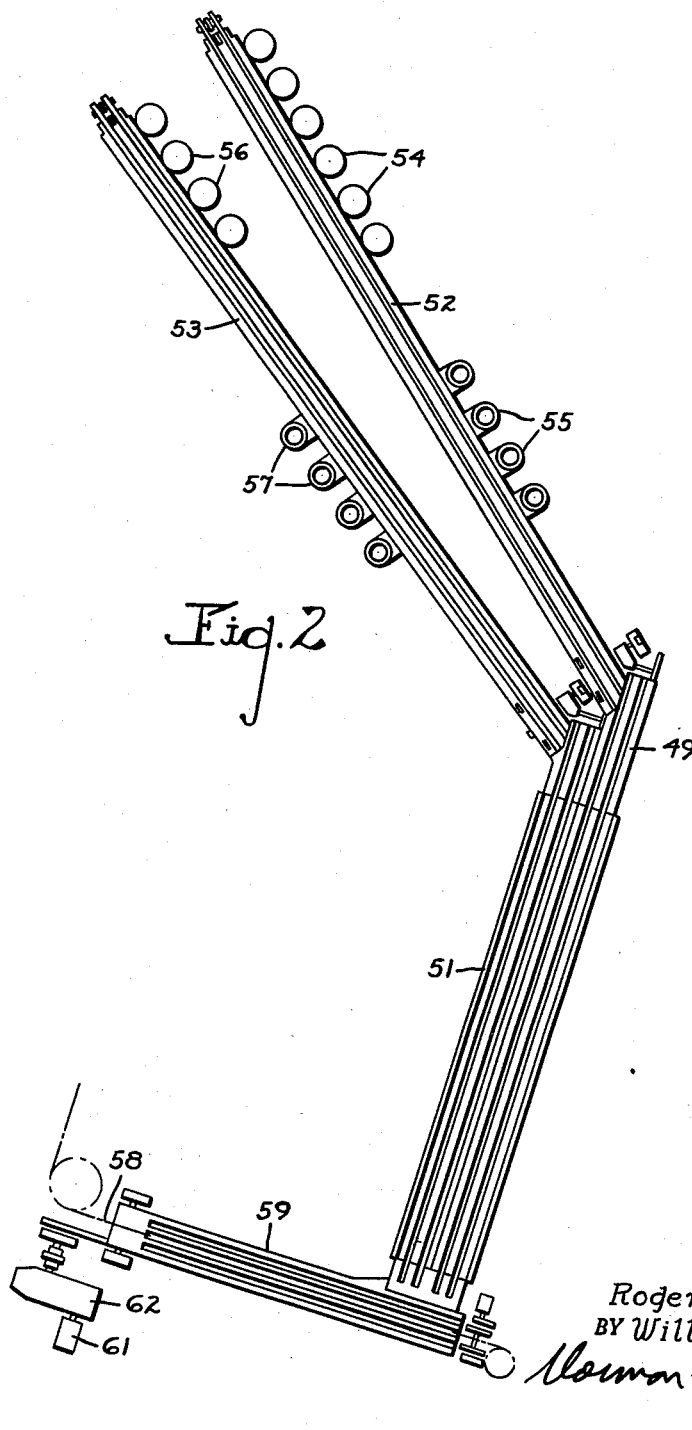

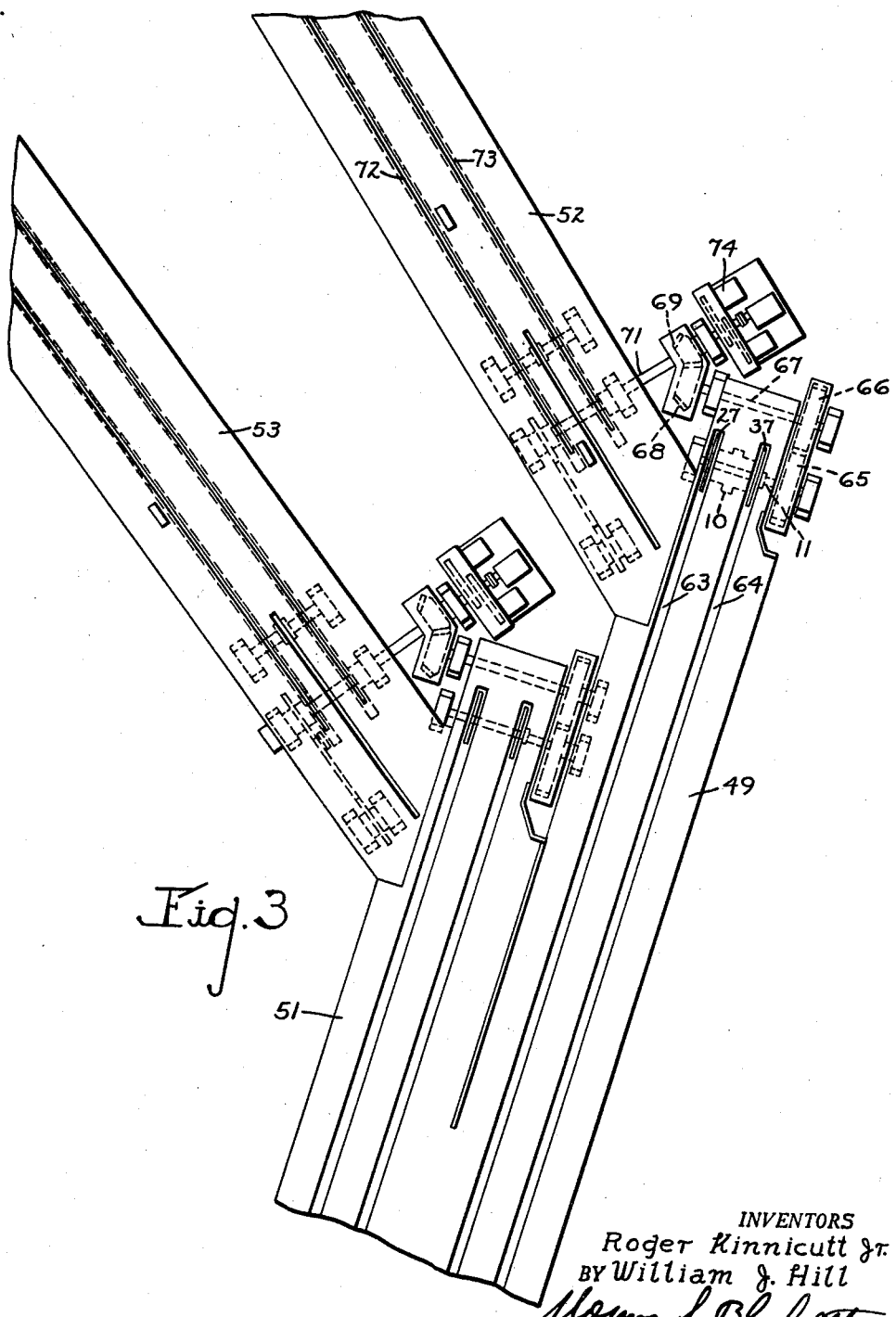

United States Patent Office 2,932,381
Patented Apr. 12, 1960

2,932,381

TORQUE EQUALIZER

Roger Kinnicutt, Jr., and William J. Hill, Worcester, Mass., assignors to Morgan Construction Company, Worcester, Mass., a corporation of Massachusetts Application April 23, 1958, Serial No. 730,425

2 Claims. (Cl. 198—203)

This invention relates to a torque equalizer and more particularly to apparatus arranged for use with a double-chain conveyor or the like.

When power is transmitted to a shaft through two sprocket wheels and the sprocket wheels are in turn driven by individual link chains there are a number of difficulties which may arise due to the fact that it is possible for unequal amounts of torque to be transferred at any given time from a chain to its sprocket wheel. Unequal driving forces may be transmitted from a chain to its sprocket due to the backlash in one chain being fully taken up while backlash spacing still exists in the other chain. When one chain and sprocket set is caused to transmit all of the power or load, the design capacity of the combination may be exceeded; this may result in a failure of a sprocket tooth or it may result in the chain riding up on top of the tooth and becoming disengaged from the tooth altogether. In the case of a conveyor, wherein a conveyor plate closely overlies the sprocket wheel, the chain may become jammed between the top of the sprocket tooth and the conveyor plate. If the sprocket wheel is attached to the shaft through an overload shear pin, replacement of the shear pin at very frequent intervals and, of course, failure of operation of the conveyor during the period of replacement is a problem. In a steel mill, for instance, where shutdowns are very expensive, because of the very large capital investment, failure of a conveyor can be a very expensive matter. These and other difficulties experienced with the prior art devices have been obviated in a novel manner by the present invention.

It is therefore an outstanding object of the present invention to provide a torque equalizer which will assure that power transmitted to a shaft through two different paths will be transmitted in equal amounts.

Another object of the present invention is the provision of a conveyor of the double-chain type in which the chains are used to carry a load attached to a shaft on which the sprocket wheels are mounted in which means is provided to assure that the power transmitted by each of the chains to its sprocket wheel and to the shaft is equal to the load so transmitted by the other chain.

Another object of this invention is the provision of a torque equalizer to be interposed between two parts of a shaft in which the two parts receive power through sprocket wheels mounted thereon, the equalizer being operative so that the power transmitted to the two parts is always equal.

A still further object of the instant invention is the provision of a double-chain conveyor having a power take-off at the idler end, wherein the power transmitted from the chains to the said power take-off are equal.

Although the novel features which are believed to be characteristic of this invention will be particularly pointed out in the claims appended hereto, the invention itself, as to its objects and advantages, the mode of its operation, and the manner of its organization may be better understood by referring to the following description taken in connection with the accompanying drawings forming a part thereof, in which:

Figure 2 is a plan view of a conveyor system in which the invention may be used, and Figure 3 is an enlarged view of a portion of the apparatus shown in Figure 2.

Figure 1:
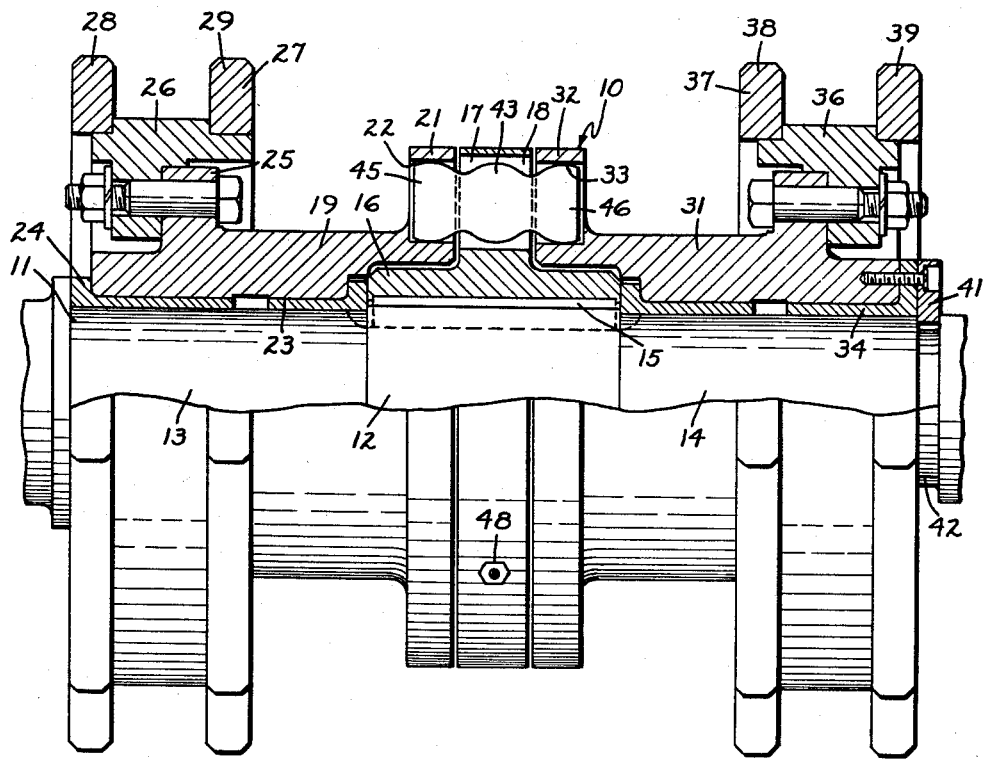
Figure 1 is a partially sectioned view of a portion of a conveyor embodying the principles of the present invention.

Referring first to Figure 1, the torque equalizer, indicated generally by the reference numeral 10, is shown in use with a shaft 11 to which a load is connected. The shaft is provided with a central portion 12 and end portions 13 and 14 on either side thereof. The central portion 12 is provided with a keyway in which is seated a key 15, which also engages a differential shaft hub 16 having a radially-extending flange 17, this flange being provided with a plurality of slots 18 extending inwardly from its outer periphery. On one side of the hub 16 is a sprocket hub 19 having a flange 21 which closely embraces the flange 17 of the differential shaft hub 16. The flange 21 is provided with a plurality of bores 22 which match in number and location the slots 18 on the flange 17. The hub 19 is provided with an inner bore 23 in which is mounted liner 24 which closely embraces the end portion 13 of the shaft 11 and permits the hub 19 to slide freely relative thereto. Adjacent the end which is away from the flange 21 the hub 19 is also provided with a flange 25 which extends radially outwardly therefrom and to which is attached the hub 26 of a sprocket wheel 27 having two spaced parallel flanges 28 and 29 in which teeth are formed.

Another sprocket hub 31 overlies the other end portion 14 of the shaft and is provided with a radial flange 32 having bores 33 which correspond in number, location and size to the bores 22 in the flange 21 of the hub 19. A liner 34 is provided within the hub 31 to permit smooth rotative motion relative to the end portion 14 of the shaft 11. Adjacent the end of the hub 31 opposite the end occupied by the flange 32 is a radial flange 35 on which is suitably mounted the hub 36 of a sprocket wheel 37, there being flanges 38 and 39 mounted on the hub 36 and provided with teeth in the usual manner. A locking plate 41 is fastened to the outer end of the hub 31 and engages an annular groove 42 formed in the shaft 11.

Located in each of the slots 18 in the flange 17 and extending axially into a bore 22 of the flange 21 and a bore 33 of the flange 32 is a differential pin 43. The differential pin is provided with a central portion and two opposite end portions 45 and 46. Each of the three portions consist of what might be called a frusto-sphere in that it resembles a sphere with portions cut away by two parallel planes at very wide spacing. Suitable smooth transition surfaces are provided to join the three portions into an integral device. A cover strip surrounds the outer periphery of the flange 17 and covers the open ends of the slots 18; the strip is suitably fastened to the flange and is provided with a grease fitting 48.

Referring now to Figure 2, which shows in a general way the type of system in which the apparatus described above may be used. A double-chain conveyor 49 is shown as located parallel to another double-chain conveyor 51, both conveyors receiving coils of rod from double-chain conveyors 52 and 53 associated, respectively, therewith. The conveyor 52 receives coils of rod from laying reels 54 and pouring reels 55 while the conveyor 53 receives coils of rod from the laying reels 56 and pouring reels 57. The conveyors 49 and 51 discharge to a hook carrier 58, the coils being transferred from conveyors 49 and 51 to the hook conveyor by means of the transfer conveyor 59. This arrangement is the subject of Kinnicutt Patent No. 2,815,847. A motor 61 drives through a gear reduction unit 62 to one end of the transfer conveyor 59. The chains of the transfer conveyor 59 drive the sprockets at the other end which, in turn, are connected to one end of the conveyors 51 and 49 to drive the sprocket shafts thereof. The chains associated with the conveyors 49 and 51 drive the sprocket shafts at the other end which shafts are connected, respectively, to the sprocket shafts of the conveyors 52 and 53. The power to drive the conveyor 52 therefore comes from the chains of the conveyor 49 and this power is transmitted from the chain through the sprocket wheel of the conveyor 49 to the adjacent sprocket wheel of the conveyor 52.

Referring now to Figure 3, the manner is shown in which this transfer of power takes place. The description will be confined to the relationship and parts associated with the conveyors 49 and 52 although it will be realized that the same construction is used between the conveyors 51 and 53. The shaft 11 is shown as constituting the sprocket shaft of the conveyor 49 and this is joined to the sprocket wheels 27 and 37 by the torque equalizer 10. The sprocket wheels 27 and 37 are driven by the chains 63 and 64, respectively, of the conveyor 49. The shaft 11 is connected by gears 65 and 66 to a shaft 67. The shaft 67 drives a bevel gear 68 which acts through a bevel gear 69 to drive the sprocket shaft 71 of the conveyor 52; the shaft 71 acts through sprocket wheels to drive the chains 72 and 73 of the conveyor 52. A cycle control apparatus 74 is driven from an end of the shaft 71.

The operation of the apparatus will now be readily understood in view of the above description. The power to drive the conveyor 52 arrives on the chains 63 and 64 of the conveyor 49. This power must be transmitted through the sprocket wheels 27 and 37 to the shaft 11 and then through the gears 65 and 66, the shaft 67, the gears 68 and 69 and the shaft 71 to the chains 72 and 73 of the conveyor 52. Referring to Figure 1, if a greater torque were to be applied to the sprocket wheel 27 than is applied to the sprocket wheel 37, the sprocket wheel would rotate to a position slightly ahead of the sprocket wheel 37. This would be permitted because of the ability of the differential pin 43 to assume various aspects of angularity relative to a plane passing through the axis of the shaft 11. As a practical matter, it is clear that the differential pin 43 and its associate equipment serves to maintain the torque transmitted through the two sprocket wheels at equal amounts but, as has been stated, it may be necessary for the wheels to take positions of rotation at a slight angularity to one another in order for these equal forces to exist. The action which takes place is very similar to the action which takes place when a pair of horses is pulling a wagon through a whiffletree. If one of the horses is lazy and does not throw himself into the work of pulling the wagon, the whiffletree will permit the hard working horse to advance slightly so that the drag of the wagon is shifted to the nonworking horse and therefore the two horses do equal amounts of work. When this is applied to the driving of a shaft, it is impossible for either of the two driving means (which may be sprocket wheels) to carry more than its proper share of the load. It will be understood, of course, that, by varying the moment arm about the center of the spherical surface of the center portion 44 of the differential pin 43, it will be possible to distribute the torque introduction to the shaft in desired proportions. But the more usual application of the invention would be where the power comes from two sources and it is desired to load the sources in equal amounts.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention having been thus described what is claimed as new and desired to secure by Letters Patent is:

1. A conveyor apparatus comprising two parallel chains, a table having slots along which the chains pass, a shaft, a primary hub fixed to the shaft and having a radial flange, a secondary hub rotatably mounted on the shaft at one side of the primary hub and having a radial flange which lies closely adjacent to the flange of the primary hub, the said secondary hub having a sprocket considerably removed from the radial flange engaging one of the chains to receive power therefrom, another secondary hub rotatably mounted on the shaft at the other side of the primary hub and having a radial flange which lies closely adjacent to the flange of the primary hub, the last-named secondary hub having a sprocket engaging the other of the chains to receive power therefrom, and differential pins extending through the flanges of the three hubs to maintain the torque transmitted from the secondary hub to the primary hub in a preselected ratio.

2. A conveyor apparatus, comprising two parallel chains, a table having slots along which the chains pass, a shaft, a primary hub fixed to the shaft and having a radial flange, a secondary hub mounted on the shaft at one side of the primary hub and having a radial flange which lies closely adjacent to the flange of the primary hub, the said secondary hub having a sprocket considerably removed from the radial flange engaging one of the chains to receive power therefrom, another secondary hub rotatably carried on the shaft at the other side of the primary hub and having a radial flange which lies closely adjacent to the flange of the primary hub, the last-named secondary hub having a sprocket engaging the other of the chains to receive power therefrom, and differential pins extending through the flanges of the three hubs to maintain the torque transmitted from the secondary hub to the primary hub in a pre-selected ratio, the end portions of each pin having generally spherical surfaces which reside in closely-fitting bores formed in the secondary hub, each pin also having a central portion which has a generally spherical surface engaging a closely-fitting radial slot in the flange of the primary hub.

References Cited in the file of this patent

UNITED STATES PATENTS

| | | |
|---|---|---|
| 1,495,703 | MacFarland | May 27, 1924 |
| 1,503,919 | Schmidt | Aug. 5, 1924 |
| 1,591,794 | Stevens | June 8, 1926 |
| 1,624,416 | MacFarland | Apr. 12, 1927 |